(12) United States Patent
Evans et al.

(10) Patent No.: US 7,086,669 B2
(45) Date of Patent: Aug. 8, 2006

(54) METHOD AND APPARATUS FOR SEALING RADIALLY EXPANDED JOINTS

(75) Inventors: M. Edward Evans, Harris County, TX (US); D. Scott Costa, Harris County, TX (US); Richard W. DeLange, Harris County, TX (US)

(73) Assignee: Grant Prideco, L.P., Houston, TX (US)

( * ) Notice: Subject to any disclaimer, the term of this patent is extended or adjusted under 35 U.S.C. 154(b) by 158 days.

(21) Appl. No.: 10/290,003

(22) Filed: Nov. 7, 2002

(65) Prior Publication Data

US 2004/0090068 A1 May 13, 2004

(51) Int. Cl.
*F16L 13/14* (2006.01)
(52) U.S. Cl. .................................. 285/382.2; 285/333
(58) Field of Classification Search ............. 285/382.2, 285/382.1, 382.5, 333, 381.1, 381.2, 381.3, 285/334
See application file for complete search history.

(56) References Cited

U.S. PATENT DOCUMENTS

| | | | |
|---|---|---|---|
| 418,752 A * | 1/1890 | Rogers | 285/381.1 |
| 2,616,729 A | 10/1952 | Hansen | |
| 2,907,589 A | 10/1959 | Knox | |
| 3,307,860 A | 3/1967 | Blount et al. | |
| 3,476,409 A | 11/1969 | Schmidt et al. | |
| 3,479,059 A | 11/1969 | Taylor et al. | |
| 3,674,292 A | 7/1972 | Demler, Sr. | |
| 3,813,751 A | 6/1974 | Smida | |
| 3,888,496 A | 6/1975 | Dryer | |
| 4,011,918 A * | 3/1977 | Jurgens | 285/333 |
| 4,026,583 A | 5/1977 | Gottlieb | |
| 4,053,247 A | 10/1977 | Marsh, Jr. | |

(Continued)

FOREIGN PATENT DOCUMENTS

EP 0 373 843 A 6/1990

(Continued)

OTHER PUBLICATIONS

Taylor W.M. et al. Cold-Forged Connector Ties Back Well Risers in Congo Field, Oil and Gas Journal, Pennwell Publishing Co. , Tulsa, US, vol. 95, No. 18, May 5, 1997, ISSN: 0030-1388.

*Primary Examiner*—David Bochna
(74) *Attorney, Agent, or Firm*—C. James Bushman; Browning Bushman P.C.

(57) ABSTRACT

Connectors and connections that enhance mechanical and sealing engagement between the ends of tubular bodies that are radially expanded by a forging tool. The connectors are designed to maintain or restore mechanical and sealing engagement following expansion. The connections are made by joining components that exhibit different spring back characteristics following mechanical deformation. Dissimilar material may be used for the connectors or the connected components can be made of the same materials but dimensioned and configured to exert an interfering force between engaged components following expansion. In operation, a material or component with a high spring back characteristic is positioned adjacent a material or component having a lower spring back characteristic. Following passage of a forging tool, the expanded components spring back differently toward their original unexpanded dimensions to produce the enhanced seal or mechanical engagement. The materials of the end connectors are selected and positioned such that a compressive or locking force is exerted between the different component of the connectors due to the difference in the spring back of the materials or components.

12 Claims, 7 Drawing Sheets

U.S. PATENT DOCUMENTS

| | | | |
|---|---|---|---|
| 4,099,745 A | 7/1978 | Cobbs | |
| 4,234,197 A | 11/1980 | Amancharia | |
| 4,253,687 A | 3/1981 | Maples | |
| 4,324,407 A | 4/1982 | Upham et al. | |
| 4,325,571 A | 4/1982 | Funderburg et al. | |
| 4,388,752 A | 6/1983 | Vinciguerra et al. | |
| 4,426,105 A * | 1/1984 | Plaquin et al. | 285/381.1 |
| 4,450,618 A | 5/1984 | Ridenour | |
| 4,487,434 A | 12/1984 | Roche | |
| 4,494,601 A | 1/1985 | Pratt et al. | |
| 4,530,527 A | 7/1985 | Holmberg | |
| 4,580,788 A | 4/1986 | Rabe et al. | |
| 4,590,995 A | 5/1986 | Evans | |
| 4,648,627 A * | 3/1987 | Reimert | 285/381.1 |
| 4,662,663 A | 5/1987 | Schmitz | |
| 4,690,436 A | 9/1987 | Hehl | |
| 4,791,796 A | 12/1988 | Ford | |
| 4,805,430 A | 2/1989 | Schmitz et al. | |
| 4,827,748 A | 5/1989 | Herring | |
| 4,893,844 A | 1/1990 | Chelette et al. | |
| 4,893,848 A | 1/1990 | Melcher | |
| 4,949,791 A | 8/1990 | Hopmann et al. | |
| 5,101,906 A | 4/1992 | Carlin et al. | |
| 5,156,043 A | 10/1992 | Ose | |
| 5,306,052 A | 4/1994 | MeGushion | |
| 5,348,095 A | 9/1994 | Worrall et al. | |
| 5,383,692 A * | 1/1995 | Watts | 285/333 |
| 5,516,157 A | 5/1996 | Williamson | |
| 5,687,995 A * | 11/1997 | Mori et al. | 285/381.2 |
| 5,794,985 A | 8/1998 | Mallis | |
| 5,921,441 A | 7/1999 | Small et al. | |
| 5,924,745 A * | 7/1999 | Campbell | 285/333 |
| 5,944,107 A | 8/1999 | Ohmer | |
| 6,305,723 B1 * | 10/2001 | Schutz et al. | 285/333 |
| 6,345,431 B1 | 2/2002 | Greig | |
| 6,409,175 B1 | 6/2002 | Evans | |
| 6,554,287 B1 * | 4/2003 | Sivley et al. | 285/334 |
| 6,607,220 B1 * | 8/2003 | Sivley, IV | 285/334 |
| 6,619,696 B1 * | 9/2003 | Baugh et al. | 285/333 |
| 6,695,012 B1 * | 2/2004 | Ring et al. | 138/98 |
| 6,712,401 B1 * | 3/2004 | Coulon et al. | 285/382 |
| 6,722,443 B1 * | 4/2004 | Metcalfe | 285/65 |

FOREIGN PATENT DOCUMENTS

| | | |
|---|---|---|
| EP | 0 961 007 A | 12/1999 |
| GB | 1 458 893 A | 12/1976 |
| GB | 2345308 A | 7/2000 |
| WO | WO 99 18328 A | 4/1999 |
| WO | WO 01 04520 A1 | 7/2000 |

* cited by examiner

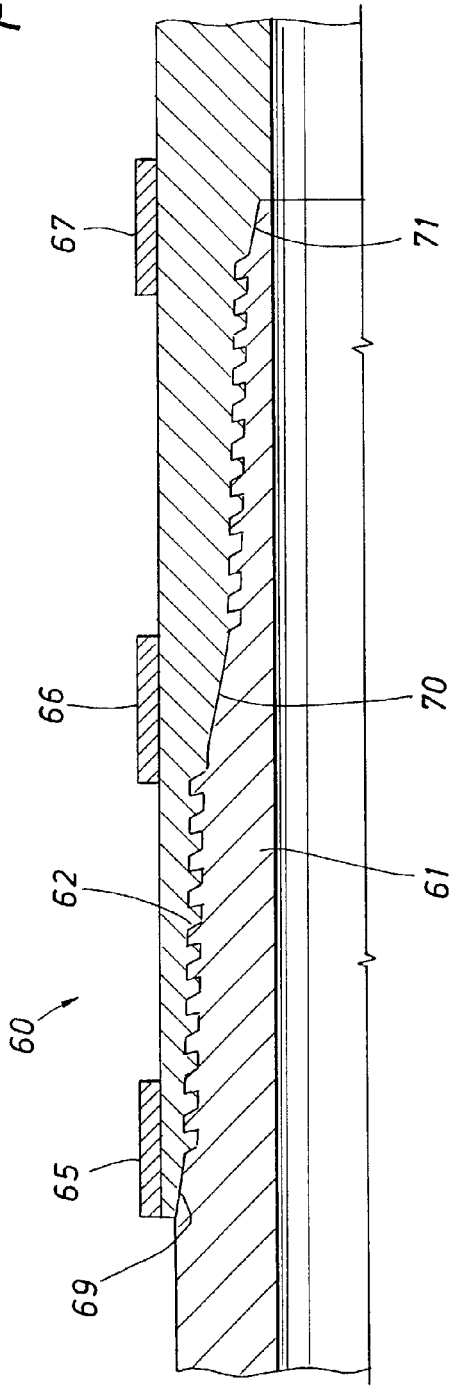
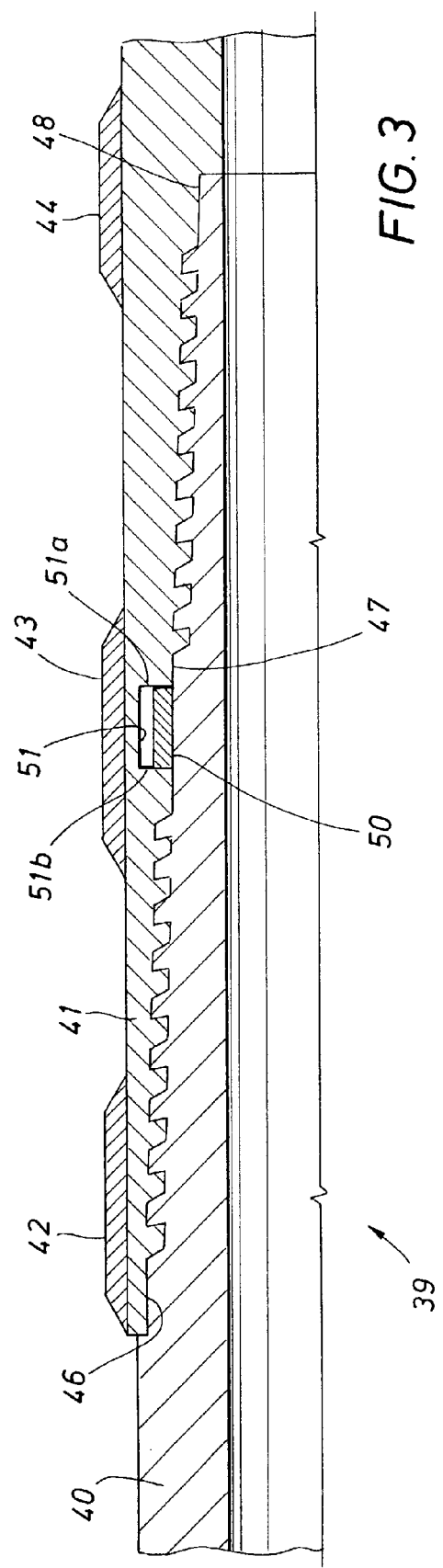

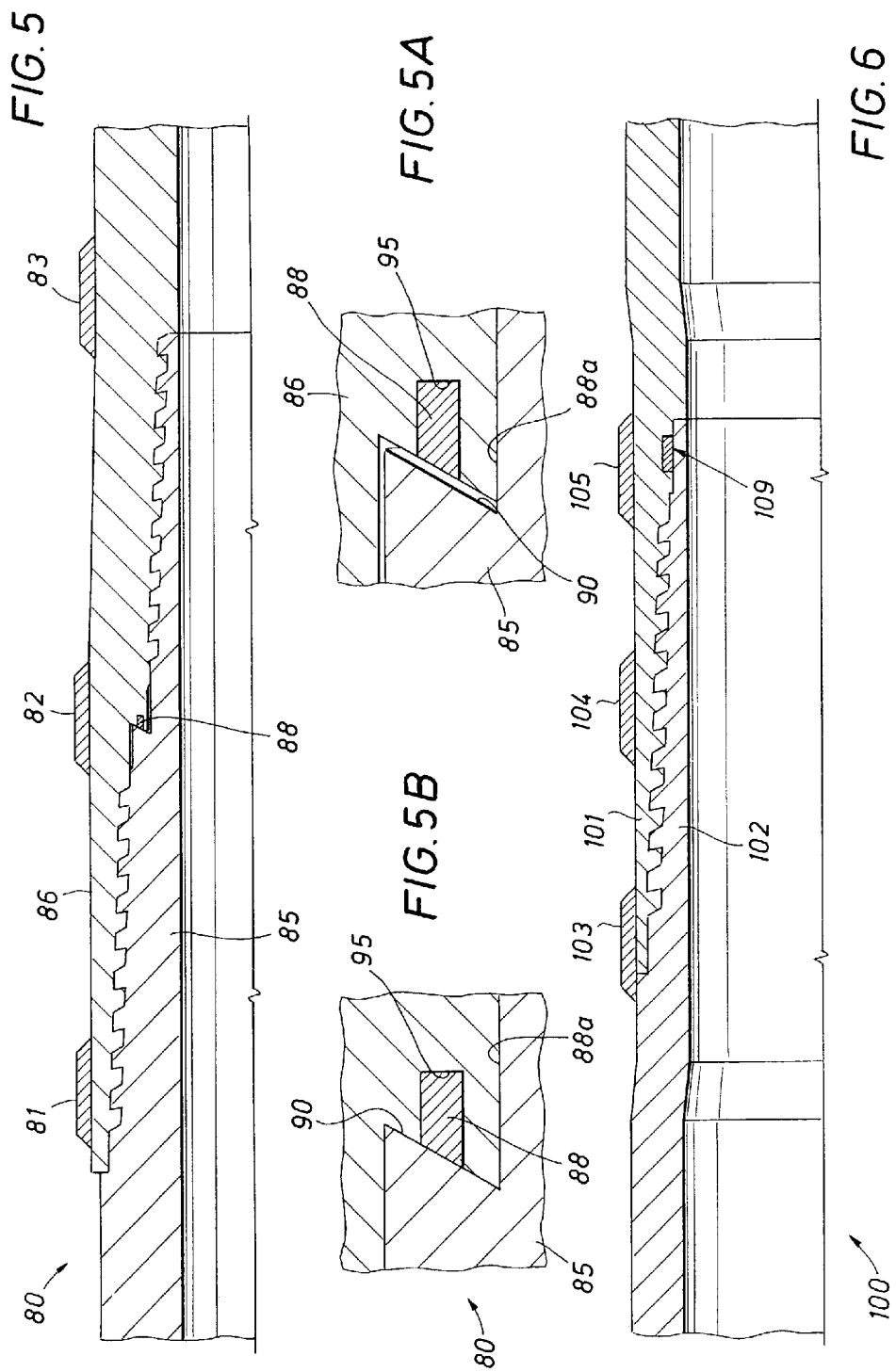

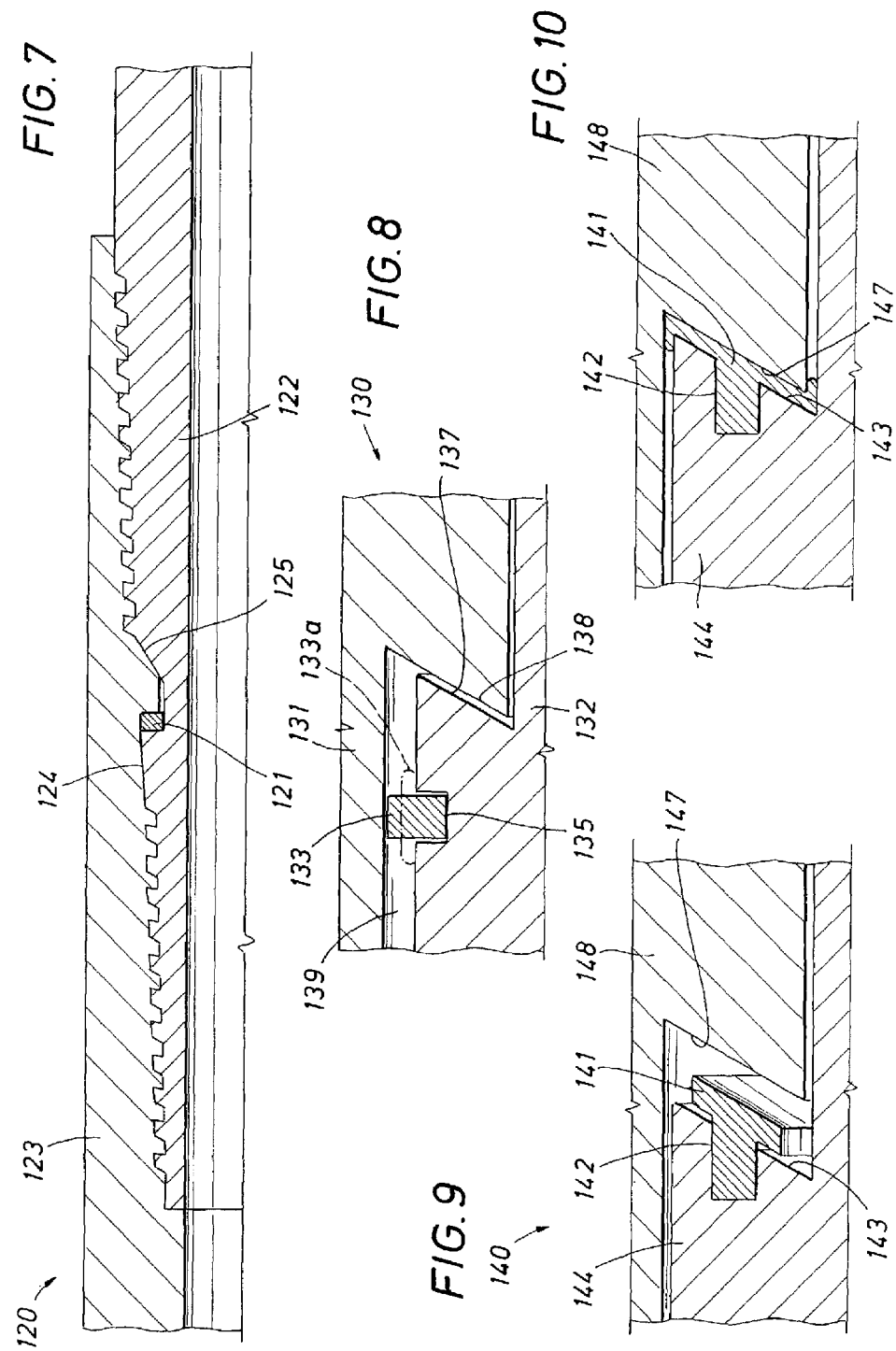

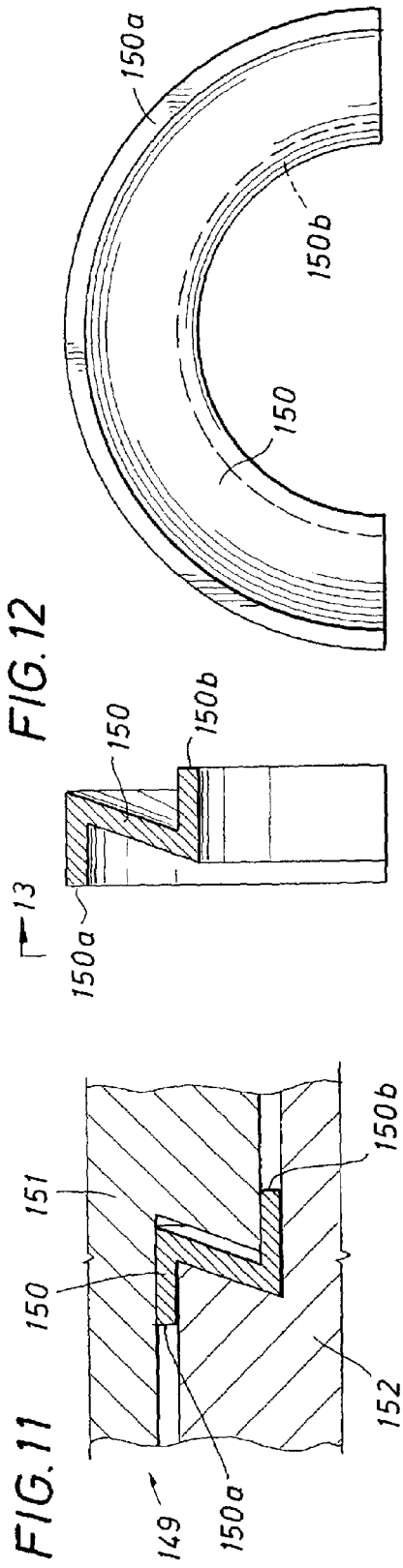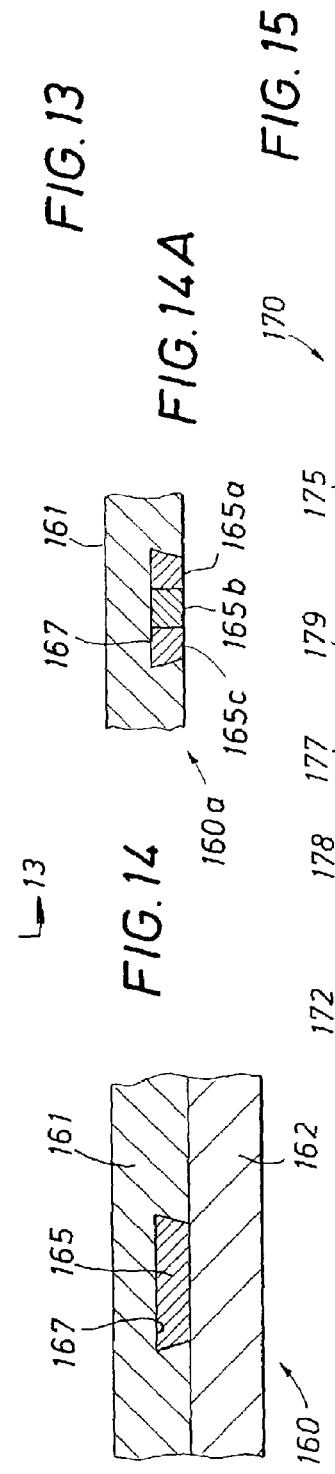

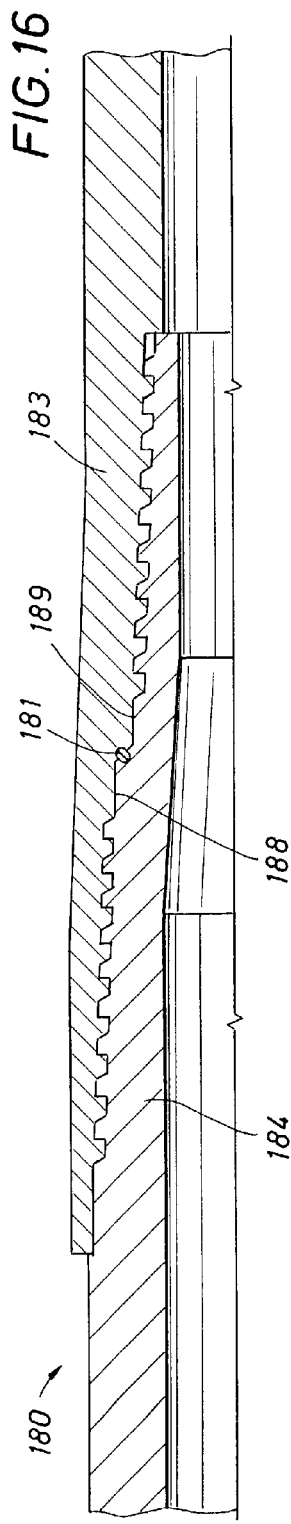
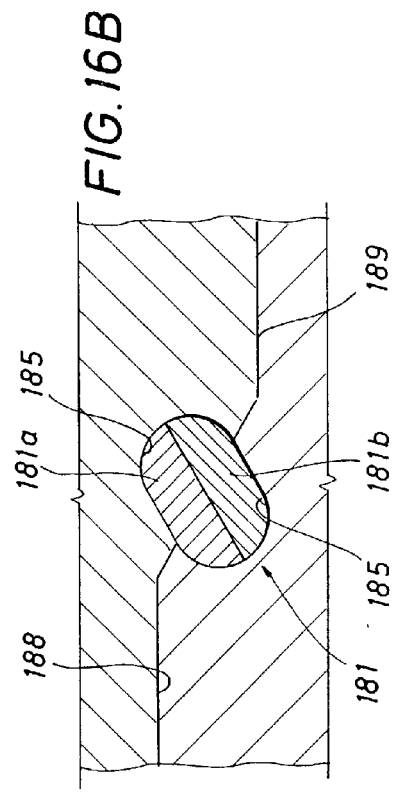
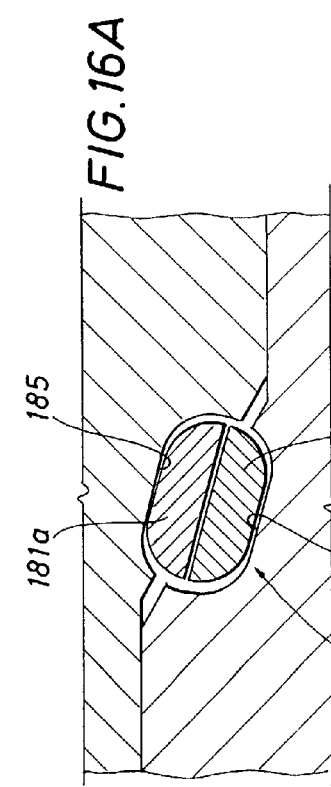
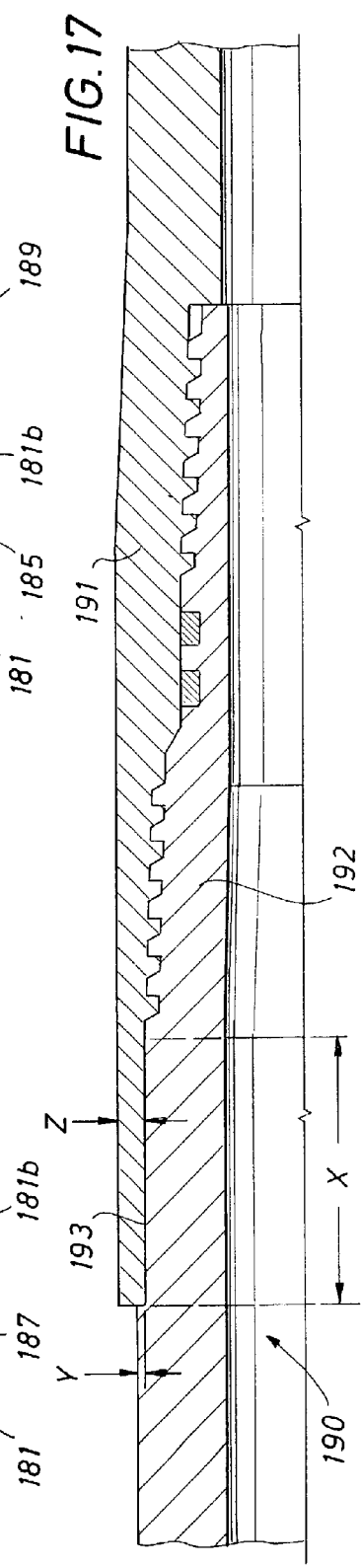

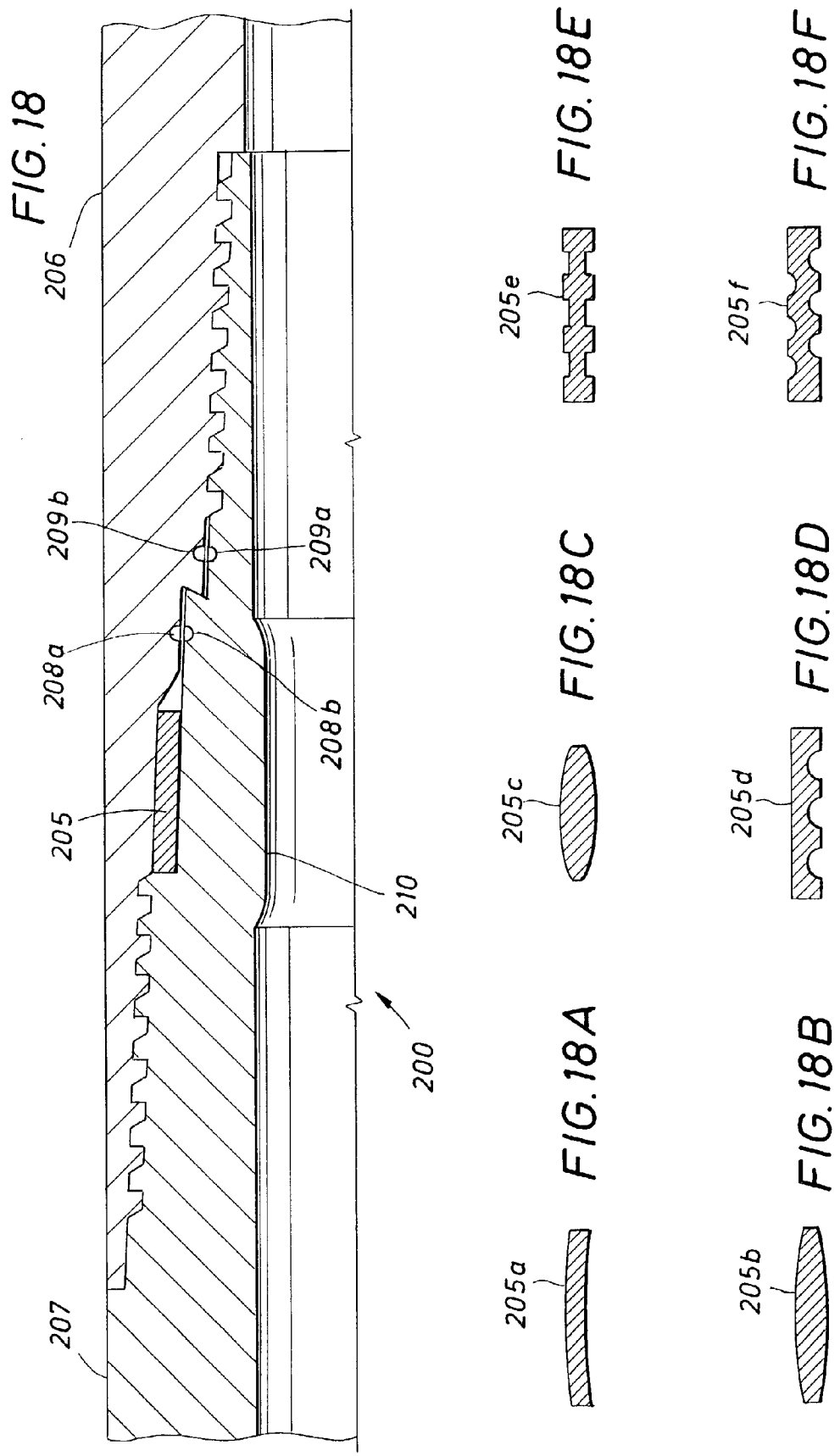

METHOD AND APPARATUS FOR SEALING RADIALLY EXPANDED JOINTS

BACKGROUND OF THE INVENTION

1. Field of the Invention

The present invention relates generally to connectors used to secure individual pipe sections together to form elongated pipe strings. More particularly, the present invention relates to end connectors used to secure together pipe sections that are connected together and then radially expanded to increase the internal openings through the string of connected pipe sections and connectors.

2. Prior Art Setting of the Invention

Conventional casing strings are made up of a series of individual pipe sections secured together at their ends by threaded connections. These sections are frequently referred to as "joints." Typically, a joint of casing is approximately 40 feet in length and has a threaded male "pin" connection at one end of the joint and a threaded female "box" connection at the opposite joint end. Some joints may have a pin at each end, with the box connection being formed by a short coupling threaded onto one of the pin connections. Some casing is made with the box connection integrally formed as a part of the tube. These integral box connections may have radially larger external dimensions than the external dimensions of the pipe body, or they may be flush joint connections in which the connection outside diameter ("OD") and the pipe OD are the same size.

A new technique for casing well bores expands the well casing pipe radially after a string of the pipe has been lowered into a wellbore. The casing pipe is enlarged radially by moving an oversized forging tool, or "pig," centrally through the pipe, causing the pipe opening to expand radially beyond its original radial dimensions. This technique allows subsequent strings of casing sections of the same size as the originally run string, to be lowered through the enlarged casing string sections and thereafter be similarly expanded. The subsequently run sting is radially expanded so that the well is cased from top to bottom by a series of linked sections of casing having substantially the same internal opening diameters. The procedure is explained in greater detail in U.S. Pat. No. 5,348,095, assigned to Shell Oil Co.

The threaded engagement between a properly secured pin and box connection in a conventional casing joint is effective in maintaining a secure mechanical connection that holds the string together and effectively seals the internal casing area from the formation wellbore environment. When the casing string and connection are enlarged radially, a conventional connection changes dimensionally in a way that can prevent the engaged components of the connection from properly engaging and sealing. The radial expansion of a conventional connection may weaken or otherwise damage the pin and box structure sufficiently to permit mechanical separation or leakage between the pin and box.

Threaded connections for oil field use mainly rely on three types of seals. These include metal-to-metal shouldering seals, seals formed by interfering engaged threads and deformable seal rings entrapped between connected components. All three seal types can be disabled by the radial expansion of the tubular joint and connection. In each case, following the expansion of the pin and box, the radial forces and interference between the pin and box members are adversely affected, causing the seals to fail.

Failure of seals is due in part to the fact that the expanded pin and box components have a natural tendency to spring back slightly after having been expanded by the pig. The axial end of the expanded pin also has a natural tendency to spring back into the internal diameter of the pipe when the pig is removed. When a conventional pin and box connection is expanded, once the expanding force is removed, the pin tends to return to its original dimensions more so than does the box. The distortion can be so great that the pin and box threads may disengage. The separation and distortion following the expansion process compromises the seals located between the pin and box allowing leakage to occur. The spring back may also create an obstruction in the bore of the pipe.

The sealing mechanism in many threaded pipe connections results exclusively from the engagement of metal-to-meal sealing surfaces in the pin and box. The engagement of these seal surfaces closes the annular space between the pin and box to provide a pressure seal. Radial expansion of the connection can distort or displace the sealing surfaces and engaged forced of these connections which will permit leakage through the annular space.

Connectors that employ an elastomeric, annular seal ring between the engaged surfaces of the pin and box are also subject to leakage when the connection expands radially. The annular elastomeric seal of conventional O-ring-sealed connectors is usually carried in an annular groove formed in either the pin or the box, or both. The seal of such a connection is formed when the annular seal ring is initially compressed radially between the fully engaged pin and box. Subsequent radial expansion of the engaged connection changes the radial compression of the annular seal ring, which in turn may permit leakage through the expanded connection. The dimensional changes in the groove occurring during the expansion process may also damage the annular seal ring, increasing the probability of a leak.

Another problem associated with radial expansion of the pipe connections is that conventional well pipe connections are susceptible to splitting along the length of the box when the connections are expanded radially. The expansion process concentrates stresses of expansion in any thin wall sections present at the ends of the connected pipe segments. The acceptable tolerance for wall thickness in conventional connectors is relatively large so that a conventional pin and box may have a non-uniform thickness that includes relatively thin wall areas without being considered defective. In this conventional connector, however, the concentration of the stresses induced by radial expansion of the connections may be sufficient to rupture or over expand the thin section. The probability of a conventional connector having an area with a relatively thin wall section in either the box or the pin is too great to permit the use of such connectors in pipe strings that are to be radially expanded.

SUMMARY OF THE INVENTION

Many materials that are plastically deformed exhibit a degree of elasticity that tends to restore the material to its original condition after the deforming force is removed. The characteristic, sometimes termed the "spring back" of the material, is employed in the present invention by using differing materials, or different configurations of the same material, to form the components of the end connectors for tubular well pipe sections that are to be expanded radially outwardly from the central pipe axis. The difference in the spring back characteristics of the differing designs or material configurations is used to increase the residual compressive forces between the components of the end connectors once the expansion is completed to enhance the mechanical interconnection and seal between the connectors. In some forms of the invention, the difference in spring back characteristic is exhibited as a difference in the amount of return movement of adjacent and/or connected components following plastic deformation of the components. The differential in return movement creates a bearing pressure or resultant force between the connected and/or adjacent components that enhances a sealing effect or a mechanical engagement or locking effect. As used herein, the terms "connected" or "adjacent" are not limited to directed physical contact or touching, but are rather intended to include a relationship in which one component may directly or indirectly affect, or respond to, another component.

In one form of the invention, a coupling is constructed of a material having a high spring back value and the engaged pin of the pipe body is constructed of a material having a lesser spring back value. The engaged pipe and coupling are radially expanded with a central forging tool that passes internally through the pipe and coupling. Following passage of the forging tool, the pipe and coupling are left in an expanded, relaxed state with no external expanding force being exerted on the components. In returning to this relaxed state, the coupling will contract more than the pin of the pipe that is received within the coupling, causing the coupling to exert a compressive force on the pipe pin. The compressive force induced by the coupling springing back against the pin in an amount that is greater than the pin springing back enhances the seal and mechanical engagement formed between the expanded pin and coupling.

The effect may be used for conventional pin and box connections made from materials with similar spring back characteristics by providing encircling bands of a high spring back characteristic at selected sealing locations along the external surface of the box. Following expansion of the connection and bands, the increased spring back of the bands applies a compressive force to the box at critical pin sealing areas.

The effect is also used to provide a post expansion seal by employing a high spring back material or configuration within the overlapping area in a connection between a pin and box of conventional materials. The increased spring back of the high spring back member operates to enhance the seal between the pin and box to maintain a seal following the expansion of the connection.

The difference in spring back of one geometric form of a given material relative to a second geometric form of the same material is also used to form a connection that is enhanced as a result of the different post expansion spring back in the two forms.

From the foregoing it will be appreciated that a primary object of the present invention is to provide a connector between tubular members that will ensure the structural integrity and sealing capability of the connector after the connector and tubular members have been expanded radially to increase their internal dimensions.

An important object of the present invention is to provide a connection that uses the inherent spring back differences between different materials, or the spring back differences between different physical configurations of the same or similar materials, to provide or restore the sealing and/or pre-load forces between adjoined tubular connections after the connections have been expanded radially.

It is an object of the present invention to provide a connection between two tubular members that uses the inherent spring back characteristics of the same metals configured in different physical shapes to enhance the seal and mechanical strength of a tubular connection following radial expansion of the connection whereby the use of the same materials reduces the possibility of producing damaging galvanic reaction in the connection.

It is a general object of the present invention to use the differing spring back characteristics of differing materials, or different configurations of the same material, to enhance the mechanical and sealing connection between connected components of materials that have been dimensionally altered.

The foregoing objects, features and advantages of the present invention, as well as others, will be more fully appreciated and understood by reference to the following drawings, specification and claims.

BRIEF DESCRIPTION OF THE DRAWINGS

FIG. 3 is a quarter sectional view illustrating a modified pin and box connection of the present invention having compression rings positioned about and within the pin and box connection with the compression rings having a greater spring back than the pin and box;

FIG. 4 is a quarter sectional view of a two-step threaded pin and box connection of the present invention employing high spring back compression seal rings carried externally about the engaged pin and box connection;

FIG. 5 is a quarter sectional view of a two-step threaded pin and box connection of the present invention employing high spring back compression rings carried externally of the box and between the pin and box;

FIG. 5A is a partial, enlarged sectional view illustrating details of a high spring back compression ring disposed between the partially engaged pin and box of the connection of FIG. 5;

FIG. 5B is a view of the detail of FIG. 5A illustrating the pin and box fully engaged;

FIG. 6 is a quarter sectional view of a modified form of a connection of the present invention employing external and internal high spring back compression rings in a single thread step connection;

FIG. 7 is a quarter sectional view of a modified form of a connector of the present invention illustrating a high spring back compression ring disposed between axial shoulders in the pin and box of the connector;

FIG. 8 is an enlarged detail view, in section, of a shouldering area in a modified connector of the present invention with a high spring back compression ring disposed between a pin and box to form a crush seal following the radial expansion of the connector;

FIG. 9 is an enlarged detail, in section, of a shouldering area in a modified connector of the present invention with a high spring back crush seal disposed in a shouldering area of the connector to provide a crush seal following make up and radial expansion of the connector;

FIG. 10 is an enlarged detail, in section, illustrating the crush seal of FIG. 9 after the connector has been expanded;

FIG. 11 is an enlarged detail, in section, of a modified high spring back crush seal of the connector of the present invention positioned between a pin and box shoulder before radial expansion of the connector;

FIG. 12 is an enlarged quarter sectional view of the crush seal illustrated in FIG. 11;

FIG. 13 is an end view taken along line 13—13 of FIG. 12 illustrating one half of the crush seal of FIG. 11;

FIG. 14 is an enlarged detailed cross-sectional view of a compression ring trapped by dovetail engagement in an annular groove of an outer connection member of the present invention for compressing the outer connection member radially inwardly after the connector is expanded radially;

FIG. 14A is an embodiment similar to that of FIG. 14 illustrating a modified, multi part compression ring designed to facilitate assembly of the ring into a receiving groove;

FIG. 15 is a detailed quarter sectional view of an engaged pin and box of the present invention illustrating a compression ring between two metal tubular sections to produce an axial sealing force between the sections after the sections have been radially extended;

FIG. 16 is a quarter sectional view of an expandable, multi-part metal seal ring disposed between two tubular connectors of the present invention before being radially expanded;

FIG. 16A is an enlarged detail of the seal ring of FIG. 16 before radial expansion of the connector;

FIG. 16B is an enlarged detail of the seal ring of FIG. 16 after radial expansion of the connector;

FIG. 17 is a quarter sectional view of two connectors of the present invention with differing spring back characteristics and having a non-interfering cylinder area that seals after radial expansion of the connectors;

FIG. 18 is a quarter sectional view of a connector of the present invention having an annular sleeve disposed between the pin and box connection; and FIGS. 18A–18F are alternative cross-sectional designs for an annular sleeve that may be used in the manner illustrated in FIG. 18.

DESCRIPTION OF THE ILLUSTRATED EMBODIMENTS

Figure 1:
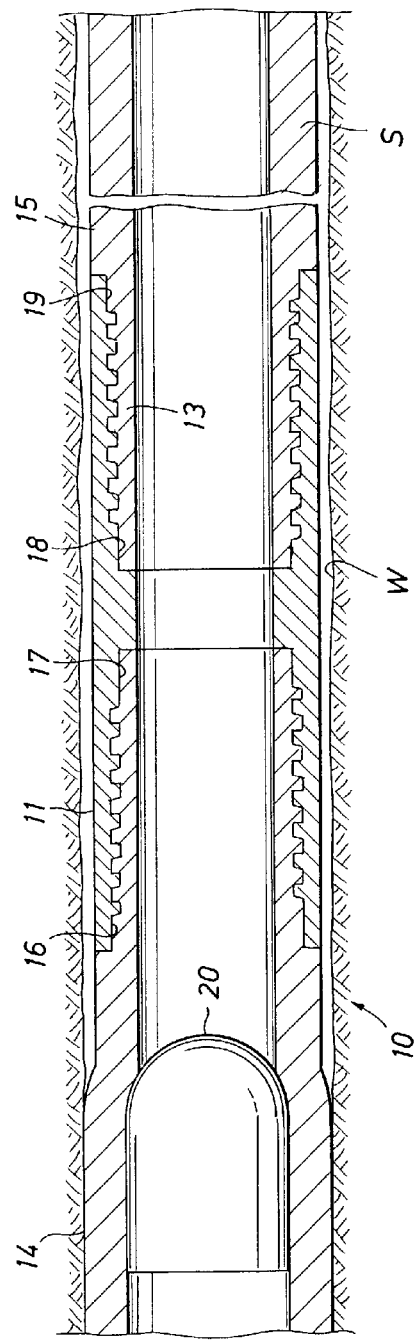
FIG. 1 is a half sectional view schematically illustrating a forging tool radially expanding a well string and connector of the present invention in which the connector is formed by the engagement of two pins mated through a central coupling and in which the coupling has a greater spring back than the two pins.

Referring to FIG. 1, a connector of the present invention is indicated generally at 10. The connector 10 is one of multiple connectors used to form a string of casing S being run into a wellbore W. The connector 10 is formed with a coupling 11 engaging the ends or pins 12 and 13 of pipe bodies 14 and 15, respectively. The pin 12 forms a pressure seal with the coupling 11 at the annular sealing areas 16 and 17. The pin 13 forms a pressure seal with the coupling 11 at the annular sealing areas 18 and 19.

The material or configuration of the coupling 11 is selected to have a higher spring back than that of the material or configuration of the pipe sections 14 and 15. A forging tool 20 passing through the center of the assembly of the pipes 14, 15 and coupling 11 radially expands the components into the wall of the wellbore W. The expansion exceeds the elastic limit of the components which permanently increase the dimensions of a central passage 21 extending axially through the pipes and coupling.

Once the forging tool 20 has expanded the connection 10 and is removed from the central passage 21, the materials of the pipes 14 and 15 and the coupling 11 spring back slightly toward their unexpanded positions. The material or configuration of the coupling 11 exhibits a greater tendency to return to its non-expanded condition than do the materials or configurations of the pipes 14 and 15. The difference in the spring back of the materials produces a compressive bearing pressure between the pipe pins 12 and 13 and the coupling 11. The increased bearing pressure functions to restore the initial pre-load and/or improve the residual mechanical engagement and pressure seal between the pins and the coupling following the radial expansion.

Figure 2:
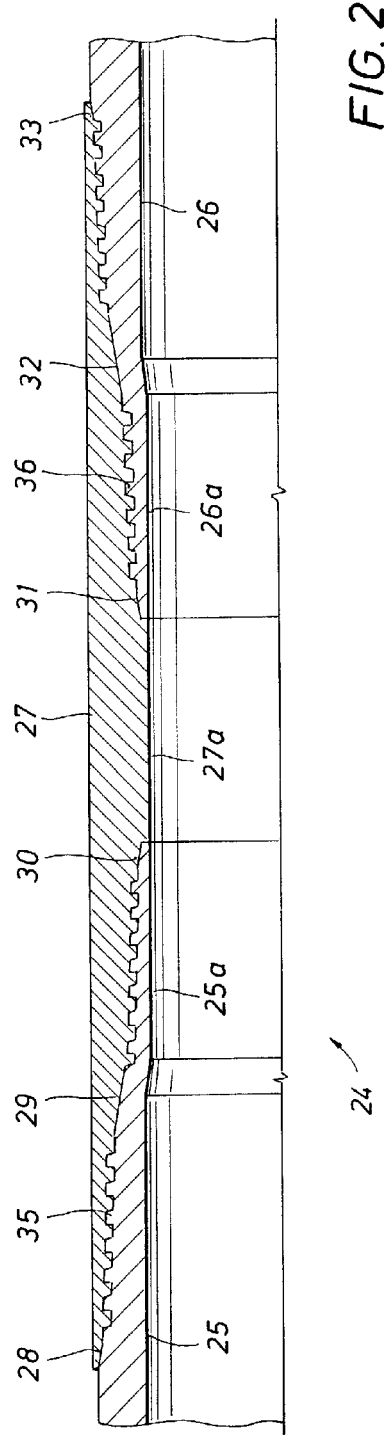
FIG. 2 is a quarter sectional view illustrating a connector of the present invention comprising a coupling with a two-step thread securing two pipe pins in which the coupling has a greater spring back than the two pins.

FIG. 2 illustrates a connector indicated generally at 24 having engagement with two pins 25 and 26 threadedly received within a coupling 27 in a configuration similar to the single step thread configuration schematically illustrated in FIG. 1. The threads of the pins and coupling of FIG. 2 are a two-step design. The pin 25 seals with the coupling 27 at annular sealing areas 28, 29 and 30. The pin 26 seals with the coupling 27 at annular sealing areas 31, 32 and 33. The two-step threads 35 and 36 formed between the pins and coupling 27 are illustrated as having a hook profile. In a preferred form of the invention, pin ends 25a and 26a and the central coupling area 27a have a reduced internal diameter as compared with the internal diameter of the adjoining bodies of pipes 25 and 26.

In one form of the invention, the coupling 27 may be constructed of aluminum or an aluminum alloy. The material of the pins 25 and 26 may be a common grade carbon steel. When the engaged pins 25 and 26 and coupling 27 are expanded radially outwardly beyond their elastic limits, the larger spring back characteristic of the aluminum coupling imposes a residual radial sealing pressure against the carbon steel pins at the seal areas 28, 29, 30, 31, 32 and 33. The decreased diameters at 25a, 26a and 27a impose greater radial expansion of the overlaying connection, increasing the resulting spring back effect and enhancing the seal and mechanical engagement. The hook profile of the threads 35 and 36 assists in maintaining connection between the engaged threads during and after the expansion process.

FIG. 3 illustrates a substantially flush joint connection, indicated generally at 39, employing circumferential compression bands 42, 43 and 44 and a central compression seal 50 to increase the sealing and mechanical engagement of the connection following radial expansion of an engaged pin 40 and box 41. The circumferential compression bands 42, 43 and 44 are positioned externally of the connection 40 about critical annular seal areas 46, 47 and 48, respectively. An internal compression ring 50 is carried in a groove 51 provided in the box 41. The groove 51 has radial sidewalls 51a and 51b that axially restrict the compression ring 50. The material of the pins 40 and 41 may be a carbon grade steel and the material of the bands 42, 43, 44 and 50 may be beryllium copper, titanium, aluminum, or other suitable material having a greater spring back than carbon steel. The bands 42, 43, 44 and 50 may also be made of carbon steel that has been configured or structured to produce a greater spring back than the pins 40 and 41.

Following radial expansion of the connection 39, the compression bands 42, 43 and 44 spring back to a greater degree than do the pin and box. The result is an increased bearing pressure created at the respective underlying sealing areas 46, 47 and 48. Additionally, an increased bearing pressure is exerted between the central compression ring 50 and the pin 40 as well as the sides 51a and 51b of the groove 51, further enhancing the seal and mechanical lock between the pin and box.

FIG. 4 is a quarter sectional view illustrating a two-step threaded connector indicated generally at 60. The connector 60 is formed by an engaged pin 61 and box 62. Annular compression seal bands 65, 66 and 67 encircle critical sealing areas 69, 70 and 71 respectively, in the connector 60. The material or configuration of the seal bands 65, 66 and 67 has a higher spring back than that of the pin 61 and box 62 so that, following radial expansion, a resultant compressive force is exerted in the critical sealing areas 69, 70 and 71.

FIG. 5 illustrates a connector, indicated generally at 80, employing annular compression bands 81, 82 and 83 encircling an engaged pin 85 and box 86. A compression ring 88 is positioned in the connection between the pin 85 and the box 86. The materials or configuration of the compression bands 81, 82, 83 and ring 88 have a greater spring back than that of the pin 85 or box 86. After radial expansion, the greater spring back of the bands 81, 82 and 83 and the ring 88 increase the radial bearing pressure in the engaged seal surfaces between the pin and box connection.

FIG. 5A illustrates details in the placement of the compression ring 88 between the pin 85 and box of the connector 80. The ring 88 is received within an annular recess 95 in a shoulder 92 of this box thread. A central shoulder 90 formed intermediate the ends of the threaded pin area is adapted to engage the shoulder 92 formed intermediate the ends of the threaded box area to provide a metal-to-metal engagement between the pin and box at their fully made up position. The pin and box detail of FIG. 5A is illustrated before full engagement of the two components.

FIG. 5B illustrates the connector 80 fully engaged, after radial expansion, with the compression ring 86 confined within the circumferential groove 95. The greater spring back of the compression ring 88 relative to that of the box 86 and pin 85 causes it to exert a compressive force against the box material underlying the groove 95 to produce an enhanced seal in the seal area 88a between the pin and box.

In operation, with the material of the compression bands 81, 82, 83 and ring 88 having a higher spring back characteristic than that of the pin 85 and box 86, radial expansion of the connection 80 produces a compressive force at each of the compression bands and ring, enhancing the mechanical and sealing engagement between the pin and box. Additionally, the greater spring back of the internal compression ring 88 following the radial expansion produces a compressive force between the pin and box at the seal area 88a to further enhance the seal between the pin and box.

FIG. 6 illustrates a flush joint connector indicated generally at 100 in which a box 101 is engaged with a pin 102. Annular compression bands 103, 104, and 105 encircle the box 101 to provide radial compression following expansion of the connector 100. An internal compression ring 109 is positioned between the tip of the pin 102 and the box 101. A greater spring back characteristic provided in the compression ring 109 relative to the pin 102 increases the sealing pressure between the pin and box following radial expansion of the connector.

FIG. 7 illustrates a connector indicated generally at 120 having a compression ring 121 positioned between shoulders in a pin 122 and box 123. The compression ring 121 is designed to spring back more than the pin and box following radial expansion to provide an increased axial force between the pin and box to enhance the seals achieved at annular seal areas 124 and 125.

The pin and box of the connector 120 are initially engaged with a snap fit. During initial assembly, the pin 122 is physically forced axially into the box 123 causing the external tapered end area of the pin in the seal area 124 to slide under the internal tapered seal area of the box in the seal area 125. The seal ring 121 is preferably positioned on the pin 122 before the pin and box are snapped together. If desired, the pin and box may be threaded so that the axial closing of the pin and box during thread make up effects the snap-together of the connection.

FIG. 8 illustrates a connection, indicated generally at 130, between a box 131 and pin 132. An annular crush seal 133 is carried in an annular groove 135 in the pin 132. At full engagement of the pin and box, a pin shoulder 137 engages a box shoulder 138. During radial expansion of the connector 130, the crush seal 133 is extruded from the groove 135 into an annular space 139 between the pin and box, as indicated by the dotted line configuration 133a. The material of the crush seal 133 is selected to have a spring back characteristic such that, following expansion, a resultant compressive force is exerted by the material of the crush seal against the surrounding components of the pin and box.

FIG. 9 illustrates a connector 140 having an annular crush seal 141 positioned in an annular groove 142 of a shoulder 143 formed in the threaded area of a pin 144. The crush seal 141 has a T-shaped cross-section. A shoulder 147 formed in the threaded area of a box 148 is adapted to engage the crush seal 141 at the full make up position of the pin and box, causing the material of the crush seal to extrude into the shoulder area and adjoining seal area between the pin and box as illustrated in FIG. 10. The extrusion of the crush seal material 141 occurs during the final make up of the pin and box. The material of the crush seal is selected to have a greater spring back than that of the material of the pin and box. Subsequently, when the connection is expanded radially, the material of the crush seal produces an axially and radially directed compressive force between the engaged pin and box components to enhance the seal between the two components.

FIGS. 11, 12 and 13 illustrate a connector indicated generally at 149 having a crush seal 150 disposed between a box 151 and a pin 152. The material of the crush seal 150 has a greater spring back characteristic than that of the pin and box. The crush seal 150 has a Z-shaped cross-section with components 150a and 150b that fit between the seal areas of the mating connection segments. The make up engagement of the shoulders between the box 151 and pin 152 extrudes the material of the crush seal 150 into the adjacent shoulder and seal areas. Subsequent radial expansion of the connector 149 produces an increased bearing pressure between the crush seal material 150 and the confining materials of the pin and box of the connection 149 to enhance the seal between the two components.

FIG. 14 illustrates a section of a connector, indicated generally at 160, in which a box connection 161 engages a pin connection 162. A compression ring 165 with a trapezoidal cross-section is illustrated trapped within an annular dovetail groove 167 formed internally of the coupling 161. After the connector 160 is radially expanded, the higher spring back characteristic of the compression ring 165 acting through its confinement within the dovetail box groove 167 draws the box 161 radially inwardly toward the pin 162 to increase the sealing engagement between the two components.

FIG. 14A illustrates a composite compression ring formed of three split-ring segments 165a, 165b and 165c. In assembling the composite compression ring, the segments 165a and 165c are first inserted into the groove 167 and the center component 165b is then inserted to lock the composite compression ring into the groove. The material or configuration, or both, of the split-ring segment 165b may be different from that of the split-ring end components 165a and 165c to increase the spring back axial forces exerted on the end components after the radial expansion.

FIG. 15 illustrates a connector 170 in which a box connection 172 engages a pin connection 173. At full engagement, the section 172 and 173 meet along an annular, frustoconical internal seal surface 175. A compression ring 177 is received within an annular groove 178 in the pin 173 and a corresponding annular groove 179 formed in the box 172. During assembly, the compression ring 177 is positioned in either the pin groove 178 or box groove 179. At complete make up, the two grooves 178 and 179 come together to completely enclose the compression ring as illustrated in FIG. 15. After the connector 170 is radially expanded, the higher spring back characteristic of the material of the compression ring 177 increases the bearing pressure between the engaged surfaces along the seal area 175 to enhance the seal between the pin and box. The ring 177 also seals against the pin and box to further enhance the seal between the components.

FIG. 16 illustrates a two-step thread connection, indicated generally at 180, having an expandable metal seal ring 181 disposed intermediate the threads formed in a box 183 and a pin 184 of the connection. As best depicted in FIG. 16A, illustrating the connector before radial expansion, the seal ring 181 is comprised of two annular sections 181a and 181b that are respectively received within an annular box groove 185 and an annular pin groove 187. Annular seal areas 188 and 189, illustrated in FIG. 16B, are formed on either side of the metal seal ring 181. The dimensions and configuration of the seal sections 181a and 181b cooperate with the configuration and dimensions of the grooves 188 and 189 to permit the box and pin to be threaded together and tightened into the pre-expansion position illustrated in FIG. 16A.

The annular sections 181a and 181b are illustrated with semi-oval cross-sections having flat bases positioned together to form a composite oval configuration. The two-piece construction and oval shape permit assembly of the pin and box to their full make up position with the seal ring members being carried within the respective grooves 185 and 187.

In the illustrated configuration of FIG. 16, the spring back in the seal rings 181a and 181b after radial expansion of the connector 180, as indicated in FIG. 16B, locks the pin and box together and seals against the two components of the connector. The result is an enhanced mechanical connection with improved sealing characteristics.

FIG. 17 illustrates a modified form of a connection of the present invention indicated generally at 190. The connector 190 includes a box 191 and pin connection 192. A post expansion seal area, indicated generally at 193, is provided by selective dimensioning of the components of the pin 191 and box 192 in the areas indicated by the axial pin and box dimension "X," the overlapping dimension "Y" between the pin and box in the overlapping area along the dimension X, and the wall thickness "Z" of the box 191. Appropriate sizing of the materials in the areas defining the X, Y, Z dimensions produces a spring back in the pin material that cooperates with the spring back of the box material to increase the post expansion bearing pressure between the pin and box in the overlapping area X. In the modification of FIG. 17, the materials of the pin and box may be identical. The difference in spring back is achieved by dimensioning the overlapping components of the pin and box whereby the spring back value is a function of material volume and configuration rather than the different metallurgical characteristics of the materials of the pin and box.

FIG. 18 of the drawings illustrates a modified form of the connection of the present invention indicated generally at 200. A metal sleeve seal element 205 is positioned in the two-step thread spacing between an engaged box 206 and pin 207. The radially internal and external surfaces of the element 205 are formed from radially spaced, parallel frustoconical surfaces defining an annular body with inside and outside diameters tapering along the central axis of the seal. The diameters of the component 205 decrease in size in a direction from the base to the tip of the pin. The axial length of the component 205 is selected to be sufficiently large to accommodate axial changes in physical dimension of the component occurring during radial expansion of the connection and the spring back following passage of the expansion tool.

Annular voids 208a, 208b and 209a, 209b are provided in the overlapping seal areas formed between the box 206 and pin 207 on either side of internal shoulders formed in the pin and box threaded areas. The voids 208a, 208b, and 209a, 209b receive material extruded during the radial expansion of the pin, box and annular seal 205. Following the radial expansion, material extruded into the voids is allowed to partially return to the source component to fill any spring back induced spacing between the pin and box following the radial expansion.

In a preferred form of the connection 200, the internal surface of the pin 207 is equipped with an internal diameter protrusion 210 in the area underlying the seal component 205. The protrusion 210 produces additional radial displacement during the expansion of the connection to enhance or increase surface contact with the component 205 in the expanded state of the connection.

In use, the long, thin, tapered metal sleeve 205 is positioned over the pin 207 before the pin is inserted into the box 206. The dimensions of the surfaces contacting the seal component 205 are preferably selected such that, at the full make up position of the pin and box, the component 205 is compressed radially sufficiently to form a pressure seal with the pin and box components of the connection. During this initial make up, the seal 205 is preferably compressed radially sufficiently to create a pressure seal that seals pressure from either the external or internal directions.

The extended axial length of the metal seal 205 minimized the adverse effects of axial deformation occurring during the radial extension of the connector. In many applications to connections of typical casing sizes, the axial length of the sleeve 205 may be as much as one inch or more. The axially tapering shape of the seal 205 causes the plastic deformation resulting from the radial expansion to increase the seal effectiveness between the engaged pin and box due to the differential spring back occurring between the larger and smaller ends of the seal element 205.

The seal element 205 is preferably constructed from a metal with an elastic modulus that is substantially lower than that of carbon steel, such as titanium or copper-beryllium. The preferred form of the seal element 205 is as illustrated in FIG. 18 with smooth internal and external circumferential surfaces engaging the underlying pin and surrounding box.

FIG. 18A illustrates a modified cross-section design 205a for the seal 205 having substantially similar end diameters and an arcing section increasing in diameter toward the center of the seal between the two ends.

FIG. 18B illustrates a modified cross-section design 205b for the seal 205 having a lens-shaped configuration.

FIG. 18C illustrates a modified cross-section design 205c for the seal 205 having an elongate, oval cross-section.

FIG. 18D illustrates a modified cross-section design 205d for the seal 205 having a smooth external circumferential surface and an internal surface provided with semicircular annular grooves.

FIG. 18E illustrates a modified cross-section design 205e for the seal 205 in which both the internal and external circumferential surface of the seal are provided with annular, flat bottom grooves.

FIG. 18F illustrates a modified cross-section design 205f for the seal 205 in which curved annular grooves are provided on the internal and external circumferential surfaces of the seal with the grooves of the internal and external surfaces being offset axially relative to each other.

It may be appreciated that while metals have been described as the materials of choice for producing enhanced mechanical and sealing engagement between plastically deformed connected components, other materials may also be employed to attain the desired result. Thus, certain plastics as well as other materials may be used alone or in combination with metals or other plastics or other synthetic materials to produce a connector of the present invention. A primary requirement of the invention is that the component with a material or design exhibiting a greater spring back characteristic be position relative to a component with a material or design exhibiting a lesser spring back characteristic so that a resultant compressive force exists between the two components following their plastic deformation. It will also be appreciated that while most of the embodiments described herein have positioned the components with the greater spring back characteristic internally of those with a lesser spring back characteristic, the components may be arranged such that mechanical engagement between the two different material produces the desired compressive force without placing the larger spring back component internally of the smaller spring back component.

It will be understood that various modifications can be made in the design, construction and operation of the present inventions without departing from the spirit or scope of such inventions. Thus, while the principal preferred construction and mode of operation of the inventions have been explained in what is now considered to represent their best embodiments, which have been illustrated and described herein, it will be understood that within the scope of the appended claims, the inventions may be practiced otherwise than as specifically illustrated and described.

What is claimed is:

1. A threaded connector for well tubulars, comprising:
    an axially and radially extending, internally threaded box member constructed from a radially expanded, plastically deformed first material, said first material having a first spring back characteristic,
    an axially and radially extending, externally threaded pin member threadedly engaged within said internally threaded box member and constructed from a radially expanded, plastically deformed second material, said second material having a second spring back characteristic that produces a smaller amount of radial contraction following plastic deformation than that produced by said first spring back characteristic of said first material whereby a compressive force is exerted between said pin member and box member resulting from a differential in said first and second spring back characteristics following radial plastic defamation of said pin and box members, and
    an axially and radially extending annular sealing component disposed, at least partially, coaxially with said pin and box, said sealing component having a third spring back characteristic for enhancing the sealing and/or mechanical engagement between said pin and box members following radial expansion of said pin and box and sealing component, said sealing component being disposed at least partially radially externally of said pin member and box member.

2. A threaded connector for well tubulars, comprising:
    an axially and radially extending, internally threaded box member constructed from a radially expanded, plastically deformed first material, said first material having a first spring back characteristic,
    an axially and radially extending, externally threaded pin member threadedly engaged within said internally threaded box member and constructed from a radially expanded, plastically deformed second material, said second material having a second spring back characteristic that produces a smaller amount of radial contraction following plastic deformation than that produced by said first spring back characteristic of said first material whereby a compressive force is exerted between said pin member and box member resulting from a differential in said first and second spring back characteristics following radial plastic defamation of said pin and box members, and
    an axially and radially extending annular sealing component disposed, at least partially, coaxially with said pin and box, said sealing component having a third spring back characteristic for enhancing the sealing and/or mechanical engagement between said pin and box members following radial expansion of said pin and box and sealing component, said sealing component being disposed at least partially radially intermediate said pin member and box member, wherein said sealing component exerts an axially directed force between said pin and box following radial expansion of said pin and box and sealing component.

3. A threaded connector is defined in claim 2, further comprising multiple axially and radially extending annular sealing components disposed at axially spaced locations coaxially with said pin and box.

4. A threaded connector as defined in claim 3, wherein said multiple sealing components are disposed radially externally of said pin and box members.

5. A threaded connector as defined in claim 3, wherein said multiple sealing components are disposed radially intermediate said pin and box members.

6. A threaded connector for well tubulars, comprising:
    an axially and radially extending, internally threaded box member constructed from a radially expanded, plastically deformed first material, said first material having a first spring back characteristic,
    an axially and radially extending, externally threaded pin member threadedly engaged within said internally threaded box member and constructed from a radially expanded, plastically deformed second material, said second material having a second spring back characteristic that produces a smaller amount of radial contraction following plastic deformation than that produced by said first spring back characteristic of said first material whereby a compressive force is exerted between said pin member and box member resulting from a differential in said first and second spring back characteristics following radial plastic defamation of said pin and box members,
    an axially and radially extending annular sealing component disposed, at least partially, coaxially with said pin and box, said sealing component having a third spring back characteristic for enhancing the sealing and/or mechanical engagement between said pin and box members following radial expansion of said pin and box and sealing component, and multiple axially and radially extending annular sealing components disposed at axially spaced locations coaxially with said pin and box, said multiple sealing components being disposed radially externally of said pin and box members.

7. A threaded connector as defined in claim 6, wherein said sealing component further exerts an axially directed force between said pin and box following radial expansion of said pin and box and sealing component.

8. A string of casing, comprising:
multiple, axially and radially extending tubular casing sections having axial end areas connected together by multiple threaded connectors wherein one or more of said connectors include,
an axially and radially extending, internally threaded box member constructed from a radially expanded, plastically deformed first material,
said first material having a first spring back characteristic, and
an axially and radially extending, externally threaded pin member threadedly engaged within said internally threaded box member and constructed from a radially expanded, plastically deformed second material, said second material having a second spring back characteristic that produces a smaller amount of radial contraction following plastic deformation than that produced by said first spring back characteristic of said first material whereby a compressive force is exerted between said pin member and box member resulting from a differential in said first and second spring back characteristics following radial plastic deformation of said pin and box members, and
an axially and radially extending annular sealing component disposed, at least partially, coaxially with said pin and box, said sealing component having a third spring back characteristic for enhancing the sealing and/or mechanical engagement between said pin and box members following radial expansion of said pin and box and sealing component, said sealing component being disposed at least partially radially externally of said pin member and box member.

9. A string of casing, comprising:
multiple, axially and radially extending tubular casing sections having axial end areas connected together by multiple threaded connectors wherein one or more of said connectors include,
an axially and radially extending, internally threaded box member constructed from a radially expanded, plastically deformed first material,
said first material having a first spring back characteristic, and
an axially and radially extending, externally threaded pin member threadedly engaged within said internally threaded box member and constructed from a radially expanded, plastically deformed second material, said second material having a second spring back characteristic that produces a smaller amount of radial contraction following plastic deformation than that produced by said first spring back characteristic of said first material whereby a compressive force is exerted between said pin member and box member resulting from a differential in said first and second spring back characteristics following radial plastic deformation of said pin and box members, and
an axially and radially extending annular sealing component disposed, at least partially, coaxially with said pin and box, said sealing component having a third spring back characteristic for enhancing the sealing and/or mechanical engagement between said pin and box members following radial expansion of said pin and box and sealing component, said sealing component being disposed at least partially radially intermediate said pin member and box member, wherein said sealing component exerts an axially directed force between said pin and box following radial expansion of said pin and box and sealing component.

10. A string of casing, comprising:
multiple, axially and radially extending tubular casing sections having axial end areas connected together by multiple threaded connectors wherein one or more of said connectors include,
an axially and radially extending, internally threaded box member constructed from a radially expanded, plastically deformed first material,
said first material having a first spring back characteristic, and
an axially and radially extending, externally threaded pin member threadedly engaged within said internally threaded box member and constructed from a radially expanded, plastically deformed second material, said second material having a second spring back characteristic that produces a smaller amount of radial contraction following plastic deformation than that produced by said first spring back characteristic of said first material whereby a compressive force is exerted between said pin member and box member resulting from a differential in said first and second spring back characteristics following radial plastic deformation of said pin and box members,
an axially and radially extending annular sealing component disposed, at least partially, coaxially with said pin and box, said sealing component having a third spring back characteristic for enhancing the sealing and/or mechanical engagement between said pin and box members following radial expansion of said pin and box and sealing component, and
multiple axially and radially extending annular sealing components disposed at axially spaced locations coaxially with said pin and box, said multiple sealing components being disposed radially externally of said pin and box members.

11. A threaded connector as defined in claims 1, 6, 8, 9, or 10, wherein said pin member is constructed substantially of a carbon steel and said box is constructed substantially of an aluminum alloy.

12. A threaded connector as defined in claims 1, 6, 8, 9, or 10, wherein said sealing component is constructed of beryllium copper, titanium, or aluminum.

* * * * *